US006757453B2

(12) United States Patent
Nekado et al.

(10) Patent No.: US 6,757,453 B2
(45) Date of Patent: Jun. 29, 2004

(54) OPTICAL WAVEGUIDE MODULE

(75) Inventors: Yoshinobu Nekado, Tokyo (JP); Tsunetoshi Saito, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 143 days.

(21) Appl. No.: 10/098,532

(22) Filed: Mar. 18, 2002

(65) Prior Publication Data

US 2002/0159674 A1 Oct. 31, 2002

(30) Foreign Application Priority Data

Mar. 19, 2001 (JP) ....................................... 2001-078606

(51) Int. Cl.[7] .............................. G02B 6/12; G02B 6/30
(52) U.S. Cl. ............................ 385/14; 385/49; 385/137
(58) Field of Search ............................ 385/14, 137, 49, 385/51, 99, 129, 130, 132

(56) References Cited

U.S. PATENT DOCUMENTS 5,999,674 A * 12/1999 Yui et al. ...................... 385/49

FOREIGN PATENT DOCUMENTS

JP 8-171029 7/1996

* cited by examiner

*Primary Examiner*—Frank G. Font
*Assistant Examiner*—Michael P. Mooney
(74) *Attorney, Agent, or Firm*—Oblon, Spivak, McClelland, Maier & Neustadt, P.C.

(57) ABSTRACT

The present invention is an optical waveguide module having e.g., a high impact resisting property and a high vibration resisting property. An optical waveguide circuit chip is supported by at least a peripheral portion of an edge portion and is stored into a storing portion of a package. The optical waveguide chip is formed by arranging an optical waveguide forming area on a substrate. An elastic member for impact relaxation of the optical waveguide circuit chip is arranged in at least one portion of the vicinity of the edge portion of the optical waveguide circuit chip. For example, the elastic member is arranged in the vicinity of each of four corners of the optical waveguide circuit chip.

9 Claims, 4 Drawing Sheets

OPTICAL WAVEGUIDE MODULE

FIELD OF THE INVENTION

The present invention relates to an optical waveguide module formed by storing an optical waveguide circuit chip mainly used for optical communication into a package.

BACKGROUND OF THE INVENTION

Various optical waveguide circuit chips each having an optical waveguide forming area formed on a substrate are used for optical communication. For example, an optical waveguide circuit chip such as a splitter and a coupler is conventionally used. These optical waveguide circuit chips approximately have a chip size from several mm to several ten mm.

The optical waveguide circuit chip is generally used by connecting the chip to an optical fiber. For example, the optical waveguide circuit chip and the optical fiber are connected to each other by fixing the optical waveguide circuit chip and an optical fiber block by an adhesive, etc. The optical fiber block is formed by fixing the optical fiber to an optical fiber arranging tool.

The optical waveguide circuit chip normally has a thickness approximately from 0.5 mm to 1 mm, and is weak in external force. As mentioned above, when the optical waveguide circuit chip and the optical fiber block are connected to each other, the strength of a connecting portion of the optical fiber block and the optical waveguide circuit chip is also weak. Therefore, the optical waveguide circuit chip and the connecting portion of the optical waveguide circuit chip and the optical fiber block are often stored to a package and are used.

Optical wavelength division multiplexing is vigorously researched and developed as a method for greatly increasing transmission capacity in the optical communications, and its practical use is advanced. In the optical wavelength division multiplexing, for example, a plurality of lights having wavelengths different from each other are multiplexed and transmitted. In recent years, the optical waveguide circuit chip such as an arrayed waveguide grating and an optical switch, and an optical waveguide circuit chip of a high function integral type constructed by combining the arrayed waveguide grating and the optical switch are used for the practical use of the wavelength division multiplexing.

The optical waveguide circuit chip such as the arrayed waveguide grating, and the optical waveguide circuit chip of a high function integral type have sizes ranging approximately from 30×30 mm to 80×80 mm and larger than the size of the conventional optical waveguide circuit chip such as a splitter and a coupler.

SUMMARY OF THE INVENTION

An optical waveguide module of the present invention comprises:

an optical waveguide circuit chip having an optical waveguide forming area formed on a substrate; and a package for supporting and storing the optical waveguide circuit chip in at least a peripheral portion of an edge portion;

wherein an elastic member for impact relaxation of the optical waveguide circuit chip is arranged in at least one portion of the vicinity of the edge portion of the optical waveguide circuit chip.

BRIEF DESCRIPTION OF THE DRAWINGS

Exemplary embodiments of the invention will now be described in connection with the accompanying drawings, wherein.

DETAILED DESCRIPTION

As mentioned above, the arrayed waveguide grating and the optical waveguide circuit chip of a high function integral type are large in mass in comparison with the conventional optical waveguide circuit chip. Therefore, the following problem exists in an optical waveguide module in which the arrayed waveguide grating and the optical waveguide circuit chip of the high function integral type are stored into a package. Namely, no optical waveguide module of this kind can resist vibrations at a conveying time and impact applied when the optical waveguide module is dropped. Therefore, there is a case in which the optical waveguide circuit chip is damaged and a connecting portion of the optical waveguide circuit chip and the optical fiber block is damaged.

For example, the following results were obtained when the present inventors stored the optical waveguide circuit chip of 32 mm×34 mm in size into the package and made an impact resisting test. The connecting portion of the optical waveguide circuit chip and the optical fiber block was cracked in 200G×1 ms (8 times/direction, 3 directions of x,y,z-axis), and an optical transmission loss was increased by 0.25 dB. The result cannot satisfy GR-1221-CORE as an index standard as a passive optical component, which is a serious problem.

One aspect of the present invention resides in an optical waveguide module having a high impact resisting property and a high vibration resisting property and able to restrain a crack, etc. from being caused in the optical waveguide circuit chip and the connecting portion of the optical waveguide circuit chip and the optical fiber block even when the optical waveguide module is vibrated at a conveying time and is dropped.

The embodiments of the invention will next be described with reference to the accompanying drawings.

Figure 1A:
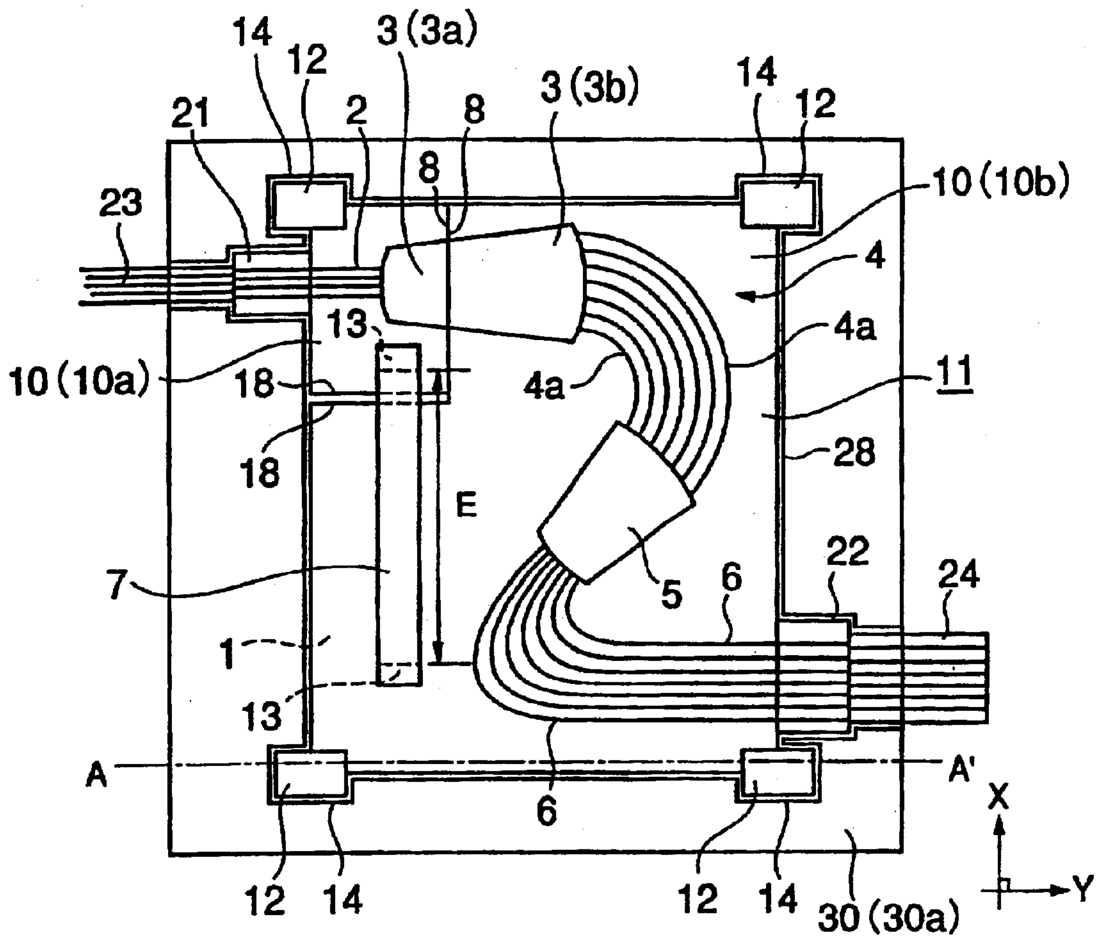
FIG. 1A is a main constructional view showing a first embodiment of an optical waveguide module in the invention.
Figure 1B:
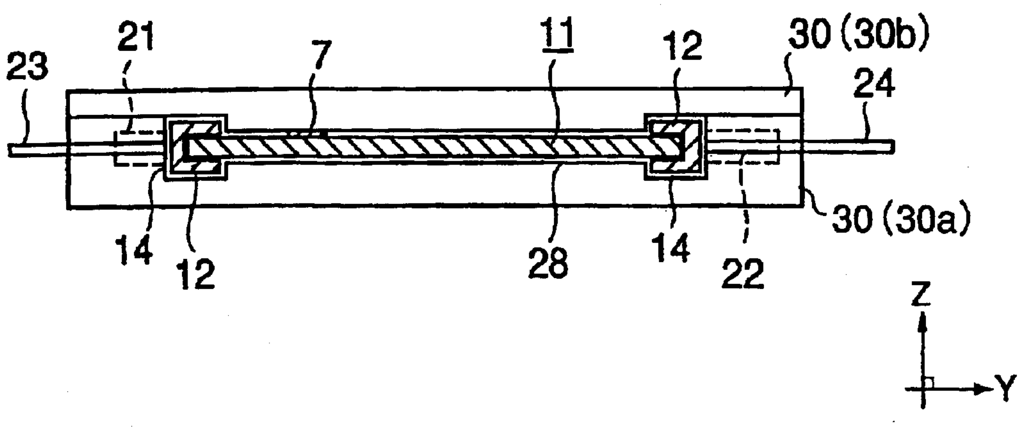
FIG. 1B is a sectional constructional view of the first embodiment.

FIG. 1A shows the main construction of a first embodiment of the optical waveguide module in the invention. The optical waveguide module of the first embodiment has a package having an upper cover, and FIG. 1A shows a plan view of the optical waveguide module in a state in which the package upper cover is omitted. FIG. 1B is a sectional view cut along a line A–A' of FIG. 1A. FIG. 1B is shown in a mounting state of the package upper cover.

As shown in FIGS. 1A and 1B, the optical waveguide module of the first embodiment is formed by storing an optical waveguide circuit chip 11 to a storing portion 28 within a package 30. The optical waveguide circuit chip 11 is supported and stored in the package 30 in at least a peripheral portion of an edge portion. The package 30 has a package box body 30*a* and a package upper cover 30*b*. The storing portion 28 of the optical waveguide circuit chip 11 is formed in the package box body 30*a*, and the storing portion 28 is filled with silicon oil functioning as a refractive index matching agent.

The optical waveguide circuit chip 11 is constructed by forming an optical waveguide forming area 10 on a substrate 1, and its weight is about 10 g. A planar shape of the optical waveguide circuit chip 11 is set to a quadrilateral shape, and the optical waveguide circuit chip 11 has 50 mm in width (length in the Y-direction), and 70 mm in length in the X-direction.

The first embodiment is characterized in that an elastic member 12 for impact relaxation of the optical waveguide circuit chip 11 is arranged in the vicinity of each of three or more (here four) corner portions of the optical waveguide circuit chip 11. In this construction, the elastic member 12 is arranged in the vicinity of each of two sets of opposite corners of the optical waveguide circuit chip 11.

As shown in FIG. 1B, the elastic member 12 is formed in a U-like shape in section in which the optical waveguide circuit chip 11 is nipped from front and rear sides of the optical waveguide circuit chip 11. The elastic member 12 is formed by fluoro-elastomer, for example, viton.

Figure 2A:
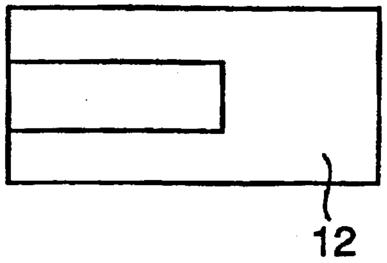
FIG. 2A is a sectional explanatory view showing an elastic member applied to the first embodiment.
Figure 2B:
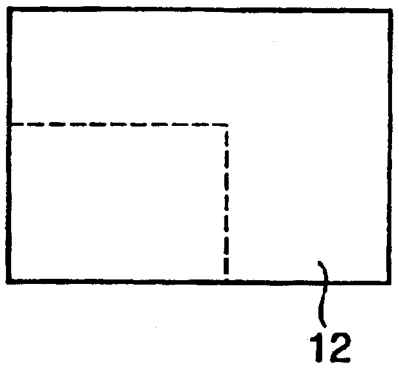
FIG. 2B is a plan explanatory view showing the elastic member applied to the first embodiment.
Figure 2C:
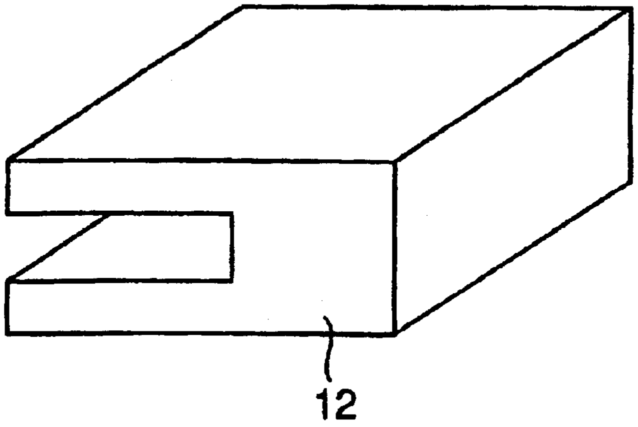
FIG. 2C is a perspective explanatory view showing the elastic member applied to the first embodiment.

FIGS. 2A to 2C show the construction of one elastic member 12 among the four elastic members 12 applied to the first embodiment. The constructions of the four elastic members 12 applied to the first embodiment are similar to each other. FIG. 2A shows a sectional view of the elastic member 12. FIG. 2B shows a plan view of the elastic member 12. FIG. 2C shows a perspective view of the elastic member 12.

As shown in FIGS. 1A and 1B, a fitting concave portion 14 for fitting the elastic member 12 thereinto is formed in the package box body 30*a* of the package 30. A clearance of about 80 $\mu$m is formed between the optical waveguide circuit chip 11 and the elastic member 12, and is also formed between the elastic member 12 and the fitting concave portion 14 of the package 30. These clearances are set to plays for moving the optical waveguide circuit chip 11 more or less within the package 30.

The optical waveguide circuit chip 11 is an arrayed waveguide grating having a function for demultiplexing or multiplexing wavelength multiplex light having a wavelength number of 50 at an interval of 100 GHz. The following waveguide structure is formed in the optical waveguide forming area 10.

Namely, the waveguide structure has at least one optical input waveguide 2, a first slab waveguide 3 connected to an output side of at least one optical input waveguide 2, an arrayed waveguide 4 connected to an output side of the first slab waveguide 3, a second slab waveguide 5 connected to an output side of the arrayed waveguide 4, and a plurality of optical output waveguides 6 connected to an output side of the second slab waveguide 5 and arranged side by side. The arrayed waveguide 4 includes a plurality of channel waveguides 4*a* for propagating light transmitted from the first slab waveguide 3 and having lengths different from each other by set amounts.

In the first embodiment, at least one of the first slab waveguide 3 and the second slab waveguide 5 (here the first slab waveguide 3) is separated on a face (cross separating face 8) crossing a path of light passing through the first slab waveguide 3 so that separating slab waveguides 3*a*, 3*b* are formed.

The cross separating face 8 is formed from one end side (an upper end side of FIG. 1A) of the optical waveguide forming area 10 to an intermediate portion of the optical waveguide forming area. A non-cross separating face 18 not crossing the first slab waveguide 3 is formed in connection with this cross separating face 8. The non-cross separating face 18 is arranged perpendicularly to the cross separating face 8. It is not necessary to set the non-cross separating face 18 to be perpendicular to the cross separating face 8, but FIG. 1A shows a mode in which the non-cross separating face 18 is perpendicular to the cross separating face 8.

The optical waveguide forming area 10 is separated into a first optical waveguide forming area 10*a* including the separating slab waveguide 3*a* on one side and a second optical waveguide forming area 10*b* including the separating slab waveguide 3*b* on the other side by the cross separating face 8 and the non-cross separating face 18. The substrate 1 is also separated by the cross separating face 8 and the non-cross separating face 18 in accordance with the optical waveguide forming areas 10*a*, 10*b*.

A slide moving member 7 having a coefficient of thermal expansion larger than that of the substrate 1 and the optical waveguide forming area 10 is formed in a mode crossing the first optical waveguide forming area 10*a* and the second optical waveguide forming area 10*b*. End sides of the slide moving member 7 are respectively fixed to the first optical waveguide forming area 10*a* and the second optical waveguide forming area 10*b* by a fixing portion 13.

The slide moving member 7 slides and moves at least one side of the separating slab waveguides 3*a*, 3*b* (here the separating slab waveguide 3*a*) along the cross separating face 8 in accordance with the temperature of the arrayed waveguide drating. The slide moving member 7 slides and moves the first optical waveguide forming area 10*a* along the cross separating face 8 with respect to the second optical waveguide forming area 10*b*.

The slide moving member 7 is arranged on surfaces of the optical waveguide forming areas 10*a*, 10*b*, and is arranged in a mode crossing the first optical waveguide forming area 10*a* and the second optical waveguide forming area 10*b* so that the following effects are obtained. Namely, the slide moving member 7 has the effect of restraining the first optical waveguide forming area 10*a* from being displaced in the Z-direction perpendicular to a substrate face at a slide moving time of the first optical waveguide forming area 10*a*.

For example, the slide moving member 7 is formed by a copper plate having a coefficient of thermal expansion of $1.65\times10^{-5}$ (1/K), and is formed such that the slide moving member 7 has a length able to compensate a center wavelength dependent on the temperature of the arrayed waveguide grating.

The present inventors noticed a linear dispersion property of the arrayed waveguide grating and variously studied this property. The present inventors have then considered that the center wavelength of the arrayed waveguide grating is compensated by moving the separating slab waveguide 3*a* by the slide moving member 7 in accordance with temperature and shifting an output end position of the optical input waveguide 2.

Figure 6:
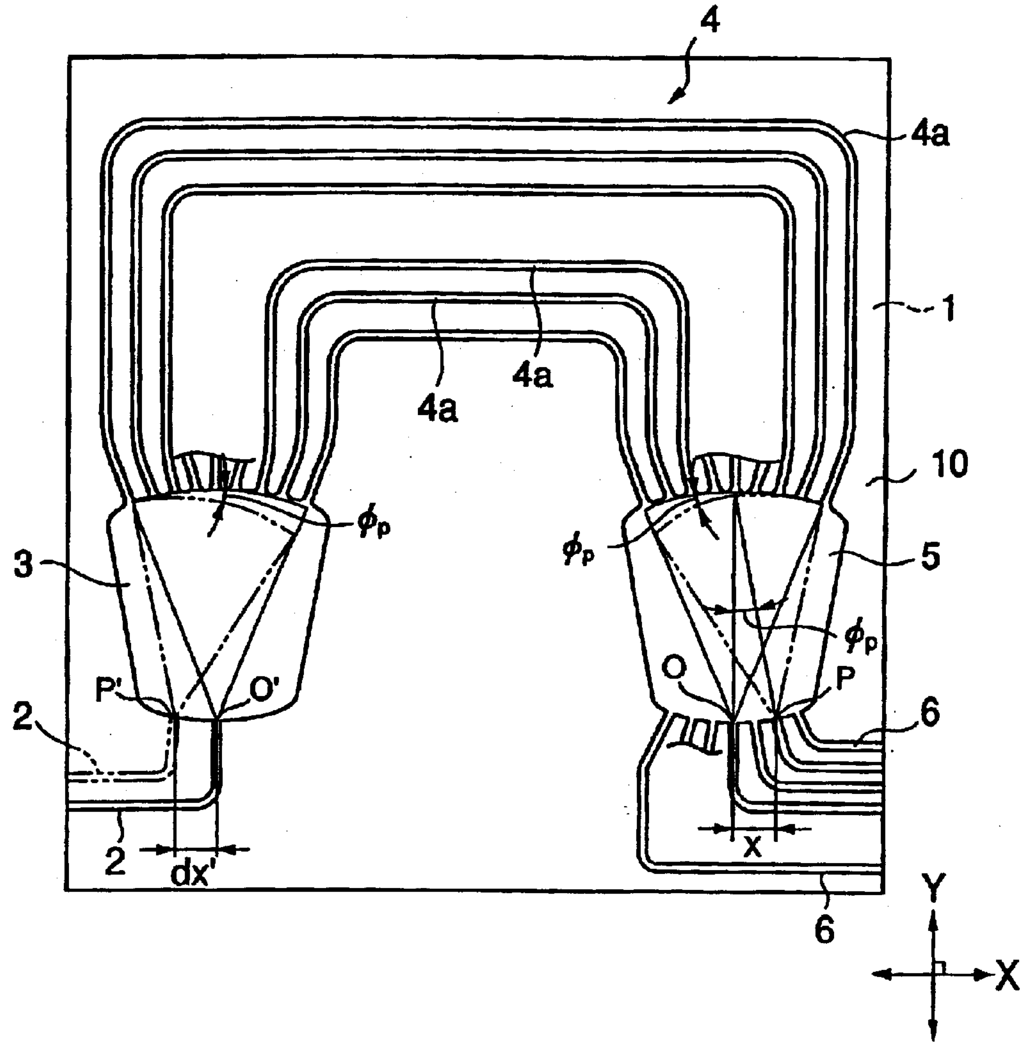
FIG. 6 is an explanatory view showing the relation of a center wavelength shift and the positions of an optical input waveguide and an optical output waveguide in an arrayed waveguide grating.

Namely, as shown in FIG. 6, a focal center of the first slab waveguide 3 is set to a point O', and a point shifted from this point O' by a distance dx' in the X-direction is set to P'. At this time, when light is inputted to the point P', an output wavelength outputted from the optical output waveguide 6 is shifted by dλ' from the output waveguide in a case in which the light is inputted from the point O'. Therefore, the output wavelength from the optical output waveguide 6 can be shifted by shifting the output end position of the optical input waveguide 2.

Here, the relation of the above wavelength shifting amount dλ' and the moving amount dx' of the output end position of the optical input waveguide 2 in the X-direction is represented as shown in the following formula 1.

$$\frac{dx'}{d\lambda'} = \frac{L_f' \cdot \Delta L}{n_s \cdot d \cdot \lambda_0} n_g \quad \text{(formula 1)}$$

In the formula 1, $L_f'$ shows a focal length of the first slab waveguide 3, and ΔL shows a difference in length between adjacent channel waveguides 4*a*, and $n_s$ shows an equivalent refractive index of each of the first slab waveguide 3 and the second slab waveguide 5. Further, in the formula 1, d shows a distance between adjacent channel waveguides, and $\lambda_0$ shows a center wavelength at a diffraction angle φ=0, and $n_g$ shows a group refractive index of the arrayed waveguide. Further, in the formula 1, $n_g$ is given by the following formula 2 by using an equivalent refractive index $n_c$ of the arrayed waveguide 4 and the center wavelength λ of light outputted from the optical output waveguide 6.

$$n_g = n_c - \lambda_0 \frac{dn_c}{d\lambda} \quad \text{(Formula 2)}$$

Accordingly, if the output end position of the optical input waveguide 2 is shifted by the distance dx' in the above X-direction so as to form dλ'=Δλ when the center wavelength outputted from the optical output waveguide 6 of the arrayed waveguide grating is shifted by Δλ in accordance with the temperature, it is possible to take-out light having no wavelength shift in the optical output waveguide 6 formed at e.g., the focal point O.

Since a similar action is caused with respect to the other optical output waveguides 6, it is possible to correct (dissolve) the center wavelength shift Δλ outputted from each optical output waveguide 6. In the first embodiment, the coefficient of thermal expansion and a fixing position interval (E of FIG. 1A) of the slide moving member 7 are suitably set, and the center wavelength of the arrayed waveguide grating is compensated by extending and contracting the slide moving member 7 in accordance with the temperature.

Namely, the slide moving member 7 is constructed such that the slide moving member 7 is extended and contracted in accordance with the coefficient of thermal expansion by a length corresponding to a moving amount of the separating slab waveguide 3*a* according to a temperature dependence shifting amount of the center wavelength of the arrayed waveguide grating. In accordance with this construction, the slide moving member 7 moves output ends of the separating slab waveguide 3*a* and the optical input waveguide 2 in the X-direction, and compensates the temperature dependence of the center wavelength of the arrayed waveguide grating.

In the first embodiment, an optical fiber block 21 is connected to one end side of the optical waveguide circuit chip 11, and an optical fiber block 22 is connected to the other end side of the optical waveguide circuit chip 11. At least one optical fiber 23, 24 are respectively arranged and fixed to the optical fiber blocks 21, 22 in accordance with the optical input waveguides 2 and the optical output waveguides 6 of the arrayed waveguide grating.

The optical fiber 23 corresponding to each optical input waveguide 2 is aligned and the optical fiber 24 corresponding to each optical output waveguide 6 is also aligned, and the optical waveguide circuit chip 11 and the optical fiber blocks 21, 22 are fixed. The optical fibers 23, 24 are fixed in the vicinity of a pulling-out port from the package 30 by a cemedine high super 5 (trade name) as an adhesive of an epoxy resin.

The first embodiment is constructed as mentioned above, and this optical waveguide module is formed by arranging the elastic member 12 for impact relaxation of the optical waveguide circuit chip 11 in the vicinity of each of four corners of the vicinity of an edge portion of the optical waveguide circuit chip 11. Accordingly, even when the optical waveguide module of the first embodiment is vibrated at a conveying time and is dropped, it is possible to restrain a crack, etc. from being caused in the optical waveguide circuit chip 11 and connecting portions of the optical waveguide circuit chip 11 and the optical fiber blocks 21, 22 so that the optical waveguide module can be set to have a high impact resisting property.

Namely, as in the first embodiment, the above effects are obtained by arranging the elastic member 12 for impact relaxation of the optical waveguide circuit chip 11 in at least one portion of the vicinity of the edge portion of the optical waveguide circuit chip 11 in the construction in which the package 30 supports and stores the optical waveguide circuit chip 11 in at least a peripheral portion of the edge portion.

The impact resisting property of the optical waveguide module can be raised if the elastic member 12 is arranged in at least one portion of the vicinity of the edge portion of the optical waveguide circuit chip 11. However, the construction of the first embodiment can further reliably show the impact resisting property improving effect.

Namely, it is possible to relax the impact in a portion easily causing a crack, etc. by the impact in the construction in which the elastic members 12 are arranged in the vicinity of at least one set of opposite corners of the optical waveguide circuit chip 11 as in the first embodiment.

Further, when the elastic members 12 are arranged in the vicinity of three or more corner portions of the optical waveguide circuit chip 11 having a quadrilateral planar shape as in the first embodiment, the impact relaxing effect of the optical waveguide circuit chip 11 can be further preferably shown.

Further, in the first embodiment, as shown in FIGS. 2A, 2B and 2C the elastic member 12 is formed in a U-like shape in section in which the optical waveguide circuit chip 11 is nipped from its front and rear sides. Accordingly, in the first embodiment, the impact of the optical waveguide circuit chip 11 is preferably relaxed so that a preferable impact resisting property and a preferable vibration resisting property can be set.

Further, in the first embodiment, the elastic member 12 is formed by fluoro-elastomer, for example, viton. The fluoro-elastomer is excellent in humidity resisting property and chemical resisting property, and is not easily deteriorated even when the interior of the package 30 is filled with a refractive index matching agent such as silicon oil. Therefore, the optical waveguide module of the first embodiment can be set to an optical waveguide module with high reliability able to maintain the above effects for a long period.

Further, since the fitting concave portion 14 for fitting the elastic member 12 thereinto is arranged in the package 30 in the optical waveguide module of the first embodiment, the elastic member 12 can be more easily arranged by fitting the elastic member 12 into the fitting concave portion 12.

Further, in the optical waveguide module of the first embodiment, a clearance for a play for moving the optical waveguide circuit chip 11 more or less within the package 30 is formed between the optical waveguide circuit chip 11 and the elastic member 12, and is also formed between the elastic member 12 and the fitting concave portion 14 of the package 30. Therefore, in the optical waveguide module of the first embodiment, the application of excessive stress to connecting portions of the optical waveguide circuit chip 11 and optical parts such as the optical fiber blocks 21, 22 can be relaxed by a play amount of this clearance so that damage of the connecting portions and an increase in transmission loss in the connecting portions can be restrained.

Further, even when the temperature is raised and the slide moving member 7 is extended in the optical waveguide module of the first embodiment, no external force is applied to the optical waveguide circuit chip 11 by interference of the optical waveguide circuit chip 11 within the package 30 so that the optical fibers 23, 24 and the optical fiber blocks 21, 22 can be moved in accordance with the extension and contraction of the slide moving member 7. Further, tensile force generated between the connections of the optical fiber blocks 21, 22 and the optical waveguide circuit chip 11 can be sufficiently reduced so that no crack is caused in the connecting portions and no connecting portions are separated.

Further, in the optical waveguide module of the first embodiment, the optical waveguide forming area of the optical waveguide circuit chip 11 is set to the arrayed waveguide grating, and the first slab waveguide 3 is separated into the separating slab waveguides 3*a*, 3*b*. The temperature dependence of the center wavelength of the arrayed waveguide grating can be reduced by moving the separating slab waveguide 3*a* along the cross separating face 8 by the slide moving member 7.

Therefore, when the optical waveguide module of the first embodiment is applied as an optical waveguide module for wavelength division multiplexing, light at a set wavelength can be stably multiplexed and demultiplexed irrespective of the temperature so that the wavelength division multiplexing can be practically used.

The effect of being able to reduce the temperature dependence of the center wavelength of the arrayed waveguide grating by moving the separating slab waveguide 3*a* along the cross separating face 8 by the slide moving member 7 as in the first embodiment can be similarly shown in an optical waveguide module having the following construction.

Namely, the above effect can be shown when the separating slab waveguides are formed by separating at least one of the first slab waveguide 3 and the second slab waveguide 5 on a face crossing a path of light passing through the slab waveguides, and a slide moving member for sliding and moving at least one side of the separating slab waveguides along the separating face in accordance with the temperature is arranged.

Figure 3:
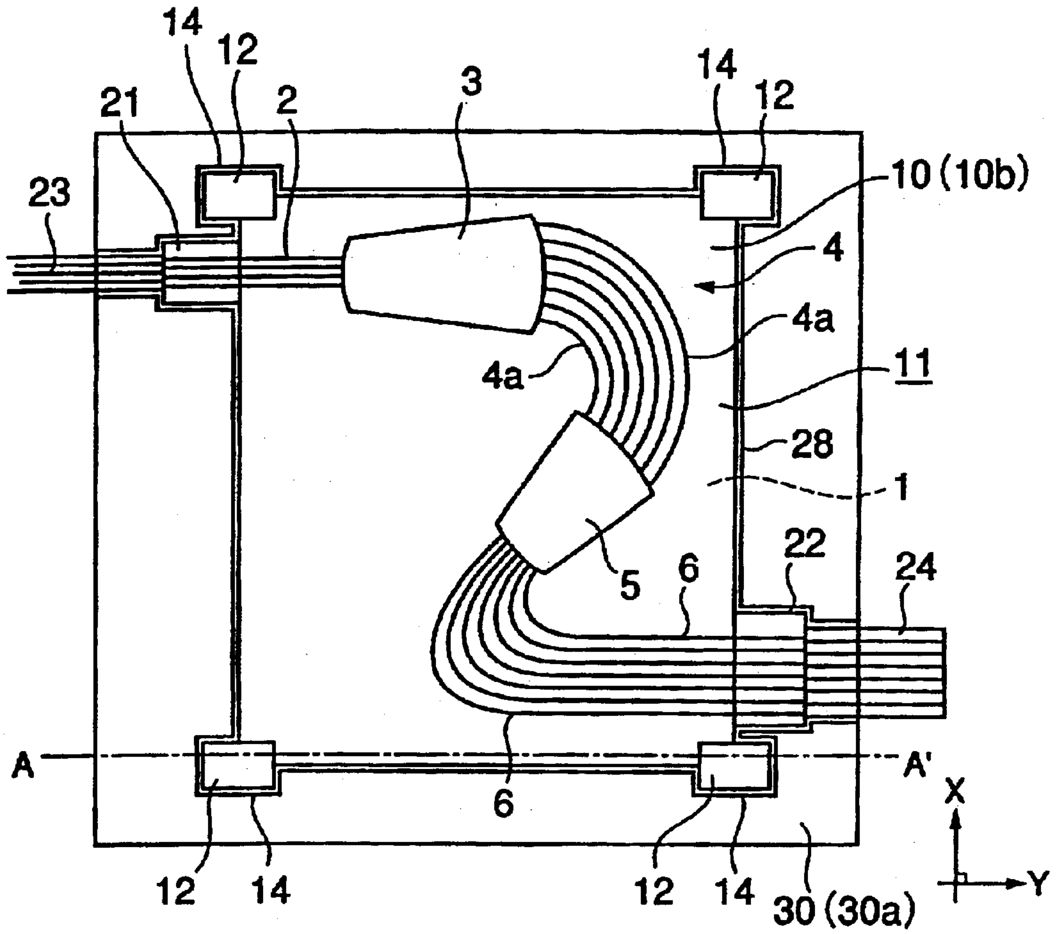
FIG. 3 is a main plan constructional view of each of second and third embodiments of the optical waveguide module in the invention.

Next, a second embodiment of the optical waveguide module in the invention will be explained. The optical waveguide module of the second embodiment is formed approximately similarly to the first embodiment. The second embodiment characteristically differs from the first embodiment in that no optical waveguide circuit chip 11 is separated on the separating face in the arrayed waveguide grating as shown in FIG. 3. Further, the slide moving member 7 arranged in the first embodiment is also omitted in the second embodiment.

The second embodiment is constructed as mentioned above. Accordingly, similar to the first embodiment, it is possible to set an optical waveguide module with high reliability having an impact resisting property and an vibration resisting property by the effect of the elastic member 12 in the second embodiment.

The present inventors prepared the optical waveguide module of the second embodiment and an optical waveguide module having a construction approximately similar to that of this optical waveguide module and having optical fibers 23, 24 unfixed by an adhesive in a pulling-out port from the package 30. The present inventors then made an impact resisting test with respect to each of the optical waveguide modules. In the optical waveguide module in which no optical fibers 23, 24 are fixed by the adhesive in the pulling-out port from the package 30, both flexible optical fibers 23, 24 and inflexible optical fibers 23, 24 within the package 30 were prepared.

As a result, each of the optical waveguide modules could resist 1000G×1 ms (10 times/direction, 3 directions of x,y,z-axis) in the impact resisting property irrespective of a fixing method of pulling-out portions of the optical fibers 23, 24 from the package 30. Namely, these optical waveguide modules satisfied GR-1221-CORE as an index standard as the above passive optical component.

Further, each of the optical waveguide modules could resist 20G×10 to 2000 Hz·min/cy (6 min/cy, 6 cy/axis) in the vibration resisting property. These optical waveguide modules also satisfied GR-1221-CORE. Further, a change in optical transmission loss before and after the impact resisting test and the vibration resisting test is 0.004 dB and has no problem at all. Accordingly, reliability of these optical waveguide modules could be confirmed.

Figure 4:
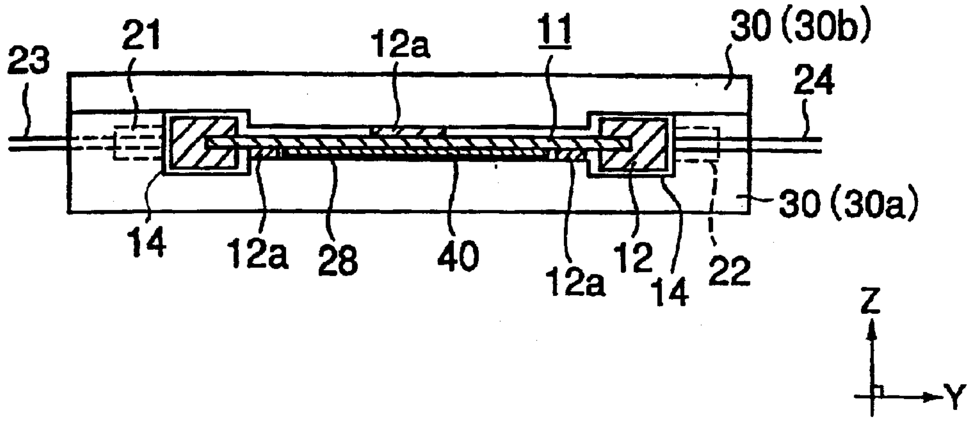
FIG. 4 is an explanatory view showing a sectional construction of the third embodiment of the optical waveguide module in the invention.

FIG. 4 shows a sectional view of a third embodiment of the optical waveguide module in the invention. In the third embodiment, the same term portions as the first and second embodiments are designated by the same reference numerals, and their overlapping explanations are omitted here.

The third embodiment is constructed approximately similarly to the second embodiment. The third embodiment characteristically differs from the second embodiment in the following two points. A first point is that a heat 40 is arranged on a lower side of the substrate 1 of the optical waveguide circuit chip 11. A second point is that an elastic member 12*a* for impact relaxation of the optical waveguide circuit chip 11 is arranged on each of upper and under sides of the optical waveguide circuit chip 11.

In the third embodiment, the optical waveguide circuit chip 11 has 40 mm in width and 50 mm in length and the heater 40 has 28 mm in width, 35 mm in length and 100 g in weight. The heater 40 is set such that the temperature of the optical waveguide circuit chip 11 is held at a constant temperature such as 70° C. higher than the room temperature. The center wavelength of the arrayed waveguide grating is constantly held by this construction, and the third embodiment can have effects approximately similar to those in the first embodiment.

In the third embodiment, the optical waveguide module becomes heavier in weight by arranging the heater 40. Therefore, in the third embodiment, the optical waveguide module with high reliability in the impact resisting property and the vibration resisting property is realized by arranging the elastic members 12*a* on the upper and under sides of the optical waveguide circuit chip 11.

The present inventors made the impact resisting test and the vibration resisting test with respect to the third embodiment. The optical waveguide module of the third embodiment could resist 500G×1 ms (8 times/direction, 3 directions of x,y,z-axis) in the impact resisting property. Further, the optical waveguide module of the third embodiment could resist 20G×10 to 2000 Hz·min/cy (6 min/cy, 6 cy/axis) in the vibration resisting property. Thus, the optical waveguide module of the third embodiment satisfied GR-1221-CORE. Further, the change in optical transmission loss before and after the impact resisting test and the vibration resisting test is 0.006 dB and has no problem at all.

The invention is not limited to each of the above embodiments, but various embodiment modes can be adopted. For example, the elastic members 12 are arranged at the four corners of the optical waveguide circuit chip 11 in each of the above embodiments, but it is sufficient to arrange the elastic member 12 in at least one portion of the vicinity of an edge portion of the optical waveguide circuit chip 11. However, as in each of the above embodiments, the impact relaxing effect of the optical waveguide circuit chip 11 using the elastic members 12 is high when the elastic members 12 are arranged in corner portions (particularly the four corners when the optical waveguide circuit chip 11 has a quadrilateral shape) of the optical waveguide circuit chip 11.

Figure 5A:
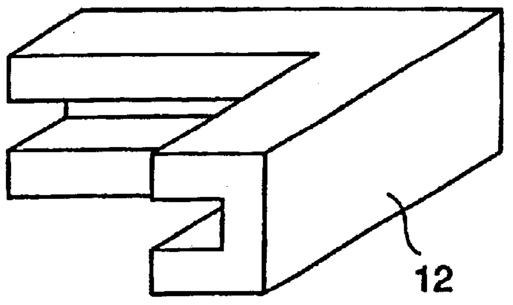
FIG. 5A is a perspective explanatory view showing a constructional example of the elastic member applied to another embodiment of the optical waveguide module in the invention.
Figure 5B:
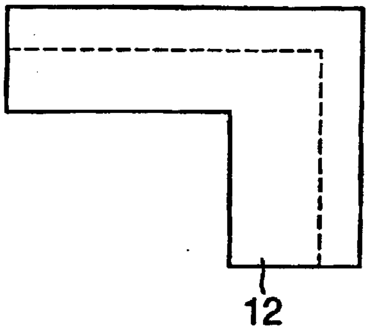
FIG. 5B is a plan explanatory view showing a constructional example of the elastic member applied to another embodiment of the optical waveguide module in the invention.

In each of the above embodiments, the elastic member 12 arranged in each of the corner portions of the optical waveguide circuit chip 11 has a shape shown in FIG. 2, but the shape of the elastic member 12 is not particularly limited, but is suitably set. For example, the elastic member 12 may be also formed in shapes shown in FIGS. 5A and 5B.

Further, in the third embodiment, the elastic members 12*a* are arranged on both the front and rear sides of the optical waveguide circuit chip 11, but the elastic member 12*a* may be also arranged on one of the front and rear sides of the optical waveguide circuit chip 11.

Further, in each of the above embodiments, the elastic members 12 and 12*a* are formed by fluoro-elastomer, but may be also formed by an elastic body of rubber, etc. except for the fluoro-elastomer, for example, viton.

Further, in each of the above embodiments, the clearance of about 80 μm is formed between the optical waveguide circuit chip 11 and the elastic member 12 and is also formed between the elastic member 12 and the fitting concave portion 14 of the package 30. However, this clearance is not limited to 80 μm, but may be set to range from several μm to several hundred μm. It is not necessary to form this clearance. However, it is preferable to form the clearance since the damage of connecting portions of the optical waveguide circuit chip 11 and the optical fiber blocks 21, 22 and an increase in splice loss can be restrained by forming the clearance.

Further, in each of the above embodiments, the optical waveguide circuit chip 11 is set to the arrayed waveguide grating, but the construction of the optical waveguide circuit chip 11 is not particularly limited, but is suitably set. The invention can be applied to an optical waveguide module in which various optical waveguide circuit chips 11 are stored and formed within the package 30. The optical waveguide module having a high impact resisting property and a high vibration resisting property can be realized by this application.

What is claimed is:

1. An optical waveguide module comprising:

an optical waveguide circuit chip having an optical waveguide forming area formed on a substrate; and a package for supporting and storing the optical waveguide circuit chip in at least a peripheral portion of an edge portion, wherein an elastic member for impact relaxation of said optical waveguide circuit chip is arranged in at least one portion of the vicinity of the edge portion of said optical waveguide circuit chip, and the elastic member is formed in a U-like shape in section in which the optical waveguide circuit chin is nipped from its front and rear sides.

2. An optical waveguide module according to claim 1, wherein the elastic member is arranged in the vicinity of at least one set of opposite corners of the optical waveguide circuit chip.

3. An optical waveguide module according to claim 1, wherein the optical waveguide circuit chip has a quadrilateral planar shape, and the elastic member is arranged in the vicinity of each of three or more corner portions of said optical waveguide circuit chip.

4. An optical waveguide module according to claim 1, wherein the elastic member for impact relaxation of said optical waveguide circuit chip is arranged on at least one of front and rear sides of the optical waveguide circuit chip.

5. An optical waveguide module according to claim 1, wherein a fitting concave portion for fitting the elastic member thereinto is arranged in the package.

6. An optical waveguide module according to claim 1, wherein a clearance is formed in at least one of a portion between the optical waveguide circuit chip and the elastic member, and a portion between the elastic member and the package.

7. An optical waveguide module according to claim 1, wherein the elastic member is formed by fluoro-elastomer.

8. An optical waveguide module according to claim 1, wherein the optical waveguide forming area of the optical waveguide chip has:

at least one optical input waveguide;

a first slab waveguide connected to an output side of the optical input waveguide;

an arrayed waveguide connected to an output side of the first slab waveguide and constructed by plural channel waveguides having lengths different from each other by set amounts and arranged side by side;

a second slab waveguide connected to an output side of the arrayed waveguide; and one or more optical output waveguides connected to an output side of the second slab waveguide.

9. An optical waveguide module according to claim 1, wherein the optical waveguide forming area of the optical waveguide circuit chip has:

at least one optical input waveguide;

a first slab waveguide connected to an output side of the optical input waveguide;

an arrayed waveguide connected to an output side of the first slab waveguide and constructed by plural channel waveguides having lengths different from each other by set amounts and arranged side by side;

a second slab waveguide connected to an output side of the arrayed waveguide; and one or more optical output waveguides connected to an output side of the second slab waveguide;

wherein separating slab waveguides are formed by separating at least one of said first and second slab waveguides on a face crossing a path of light passing through the slab waveguides; and a slide moving member for sliding and moving at least one side of the separating slab waveguide along said separating face in accordance with temperature is arranged.

* * * * *